United States Patent [19]

Staudacher et al.

[11] 4,198,136
[45] Apr. 15, 1980

[54] REPRODUCING OF INTERSPERSED MOTION-PICTURE SCENES AND STILL SHOTS

[75] Inventors: Frank Staudacher, Haan; Otto Stemme, München; Peter Lermann, Narring; Werner Went, Leverkusen; Volkmar Stenzenberger, Unterhaching; Eberhard Herzig, Cologne; Friedrich Stumpf, München; Thomas Scheller, Munich; Jürgen Sylla, München; Friedrich Winkler; Johann Zanner, both of Unterhaching, all of Fed. Rep. of Germany

[73] Assignee: AGFA-Gevaert, A.G., Leverkusen, Fed. Rep. of Germany

[21] Appl. No.: 950,126

[22] Filed: Oct. 10, 1978

[30] Foreign Application Priority Data

Oct. 13, 1977 [DE] Fed. Rep. of Germany ....... 2746036

[51] Int. Cl.² ............................................ G03B 21/38
[52] U.S. Cl. ..................................... 352/169; 352/92; 352/194; 352/124
[58] Field of Search ................. 352/92, 169, 137, 121, 352/191, 194, 124

[56] References Cited

U.S. PATENT DOCUMENTS

| 1,944,024 | 1/1934 | Foster et al. | 352/124 |
| 3,301,628 | 1/1967 | Hellmund | 352/169 |
| 3,309,163 | 3/1967 | White | 352/92 |
| 3,447,864 | 6/1969 | Shadley | 352/169 |
| 3,515,470 | 6/1970 | Browder | 352/92 |
| 3,520,596 | 7/1970 | O'Donnell et al. | 352/92 |
| 3,609,019 | 9/1971 | Tuber | 352/169 |

*Primary Examiner*—Monroe H. Hayes
*Attorney, Agent, or Firm*—Michael J. Striker

[57] ABSTRACT

The reproducing apparatus, such as a motion-picture film projector, stops recording medium transport in response to interrupt-transport frame markings on the recording medium and reproduces the thusly marked image frames as still images. Interrupt-transport frame markings are provided at the terminal frame of each motion-picture scene on the recording medium, or at each still-shot image frame on the recording medium, or both. The user of the reproducing apparatus can select automatic reproduction of motion-picture scenes interspersed with automatic still reproduction of still shots, and can additionally select automatic still reproduction of the terminal frame of each motion-picture scene.

2 Claims, 16 Drawing Figures

REPRODUCING OF INTERSPERSED MOTION-PICTURE SCENES AND STILL SHOTS

BACKGROUND OF THE INVENTION

The present invention concerns the reproduction of motion-picture scenes and still images on recording media, especially but not necessarily motion-picture film, video tape, and the like.

The concept of interspersing still images with motion-picture scenes on motion-picture film has long been known. For example, in the days of silent movies, it was a common practice to project the dialogue titles as stills intermediate motion-picture scenes, to economize on the amount of film needed. More recently, a variety of audiovisual machines, especially teaching machines, have the capability of projecting film partly in a moving-picture mode and partly in a still-image mode, in accordance with a preestablished program. The interruption of the projector's film transport system is controlled either by optically scanned markings on the film or by magnetic signals recorded on a control tape for the projector.

The known techniques and equipment of this type are complex and expensive, and therefore exclude the amateur or hobbyist from the possibility of saving on film by using motion-picture film for interspersed motion-picture scenes and still shots. In particular the preparation of programs using commercially available equipment exceeds the abilities of the average amateur, and is typically done by specialist firms for special applications.

With motion-picture projectors, it is a common capability to be able to interrupt film transport so that, at least for a limited period of time, a single film frame can be projected in the manner of a still shot. Also, some projectors are provided with a buffer-loop feature, so that at any desired point of the film normal-speed projection can be terminated and the projected speed then decreased or increased for special effects purposes.

A typical conventional cassette-type motion-picture film, when exposed at the normal rate of about 18 frames per second, provides a film duration of somewhat more than three minutes. Slide film of comparable purchase price affords thirty-six exposures. If one assumes that a motion-picture scene averages fifteen seconds, then a motion-picture film affords about fifteen scenes. If one assumes that a slide is projected on the average for about fifteen seconds before going on to the next slide—and in general the viewing time is longer—then it becomes apparent that the viewing time afforded by such a slide film is about three times as long as that afforded by a motion-picture film.

This ratio can be exploited with motion-picture projectors having the capability to project a single film frame as a still, or having the capability of slowing down the film-projection speed, i.e., to increase in a visually appropriate manner the amount of viewing time which the motion-picture film of given length provides. However, if the operator is to do this manually during projection of the film, he must be extremely alert and quick, a rather impractical possibility. Furthermore, in the case where, for example, a single still-shot frame intervenes between two motion-picture scenes, the operator may indeed have no way of knowing that the still-shot frame is present on the film and that he should manually stop film transport to project it as a still.

Automatic prolonging of the viewing time afforded by motion-picture projection would for the reasons explained above be very desirable, i.e., if the operator did not have to intervene in this complicated way.

Even more importantly, for ordinary amateur purposes, it would be particularly desirable to be able to record motion-picture scenes and still shots interspersed therewith on a single motion-picture film, using a single motion-picture camera and thereafter a single reproducing apparatus. In particular, if still shots are to be taken in substantial numbers, then the possibility of using the comparatively enormous length of a motion-picture film for still shots, but without limitation upon the interspersing of motion-picture scenes, would afford the average user a very great economy, and also result in space-savings when such films are stored.

SUMMARY OF THE INVENTION

Accordingly, it is the general object of the invention to provide a method and apparatus which better utilize the capabilities of motion-picture film in the sense described above, but in such a way as to require little or no intervention by the user, and furthermore in a way which is as simple and inexpensive as possible.

In accordance with the present invention, this is achieved by providing certain frames of the motion-picture film—i.e., when motion-picture film is the recording medium involved—with interrupt-transport markings which, when the film is run through a reproducing apparatus, can be detected by a marking detector and used to interrupt film transport.

In accordance with one concept of the invention, each single-exposure shot on the motion-picture film is provided with an interrupt-transport marking. Additionally, for example the terminal frame of each motion-picture scene can be provided with an interrupt-transport marking. In this way, when the film is projected, the motion-picture scenes are projected in normal fashion, and when the film comes to a single-exposure shot, that frame is projected as a still image. If the terminal frame of each motion-picture scene too is provided with an interrupt-transport marking, then each terminal frame will likewise be projected as a still image, e.g., for the sake of a better transition from motion-picture to still projection. An automatic time-delay device can be provided so that each still image projection will last a predetermined appropriate time interval, whereupon the next motion-picture scene will commence or the next single-exposure shot be projected as a still. Even if the operator is called upon to press a button or the like to terminate still image projection and resume film transport, the inconvenience to him is evidently minimal.

The particularly cost-conscious photographer may, in the extreme case, use the motion-picture film to take still shots exclusively, yielding ca. a hundredfold gain in the number of still shots which can be taken, but at all times retaining the ability to select motion-picture filming of a particular scene. A commercial motion-picture cassette film will have, for example, a length on the order of three thousand single frames.

Actually, besides interspersing single-exposure shots with motion-picture scenes, another capability or aesthetic which emerges with the present invention has been found to reside in the stretching out of motion-picture scenes by still-image projection of the terminal frame of each scene, i.e., irrespective of whether the film has also been used to take single-exposure shots. It has been found that still-image projection of the terminal frame of each motion-picture scene, particularly for example in contexts such as family vacation home-movies and the like, has an agreeable aesthetic effect for the viewers. For example, the motion-picture scenes filmed may often be of rather short duration and of subject matter not of a particularly dynamic visual character, e.g., short motion-picture scenes of landmark buildings, nature scenes, and the like. Still-image projection of the terminal frame in each motion-picture scene of that type can, for example, extend the length of time in which the photographed subject can be discussed by the viewers, in a way which is per se aesthetically convincing and furthermore prevents the hurried effect of projecting a sequence of short motion-picture scenes without interruption. Indeed, the technique of projecting as a still the terminal frame of each motion-picture scene proves to be so natural a one, that the increase in viewing duration tends considerably to exceed the aforementioned factor of three.

Our copending U.S. patent application Ser. No. 950,127 filed on the same day as the present application and entitled "MARKING OF INTERSPERSED MOTION-PICTURE SCENES AND STILL SHOTS WITH INTERRUPT-TRANSPORT MARKINGS" discloses motion-picture cameras and other apparatuses capable of providing interrupt-transport markings at single exposure shots on a recording medium, such as motion-picture film, video tape, or the like, and also end-of-scene interrupt-transport frame markings at the terminal frames of motion-picture scenes. The entire disclosure of that copending application is incorporated herein by reference.

The present invention provides a reproducing apparatus and method with which recording medium transport during reproduction is halted, either for a limited predetermined time interval or else until the operator commands resumption, in response to detection of a single-exposure frame marking and/or an end-of-scene frame marking on the recording medium. The frame markings are preferably located on the recording medium itself, outside the spatial or frequency range of the image information thereon, e.g., at the edge of a motion-picture film laterally of the frames thereof, or, in the case of magnetic-tape-recorded picture information, in a frequency range outside that reserved for the conventionally recorded picture information and other information.

If the recording medium is provided with end-of-scene interrupt-transport frame markings only, e.g., because no single-image shots are present, then during motion-picture reproduction the terminal frame of each scene will be protractedly displayed in the manner of a still, for example allowing viewers additional time to discuss the just completed scene before viewing the next one. If still-image frame markings are also provided, then the still-image shots are likewise reproduced as stills. Advantageously, the operator can select a mode of operation whereby transport is halted in response to both still-shot and end-of-scene frame markings, or just still-shot markings, or just end-of-scene frame markings, or the operator can override the interrupt-transport action to obtain conventional reproduction.

In case the recording medium has not been provided with end-of-scene and/or still-shot frame markings by the recording apparatus, the marking means can be provided in the reproducing apparatus. Additionally, the reproducing apparatus can be provided with means for providing further markings constituting further information, such as print commands which command an automatic printer to make specified numbers of copies of specified frames, and so forth.

Preferably, the detector in the reproducing apparatus for the interrupt-transport markings is operative only while the recording medium is in transport, or else only while the recording medium is at a standstill. Of course, the relationship between each interrupt-transport marking and the correlated frame will be given, if the interrupt-transport markings were provided by the recording apparatus, in which case the detector in the reproducing apparatus must be located or otherwise designed to take this relationship, e.g., a spatial phase shift, into account.

In the case of a motion-picture film reproducing apparatus, such as a movie projector, it is preferred that, if the detection of interrupt-transport markings is done during transport, the detection be gated to take place during a predetermined point in the one-frame transport cycle of the apparatus. If the interrupt-transport markings are detected during film standstill, i.e., during the interval when the frame presently being projected is briefly at a standstill at the projection gate, the possibility of erroneous marking detection can be reduced here likewise by gating the detection so that it occurs during a predetermined phase of the frame-standstill time interval.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
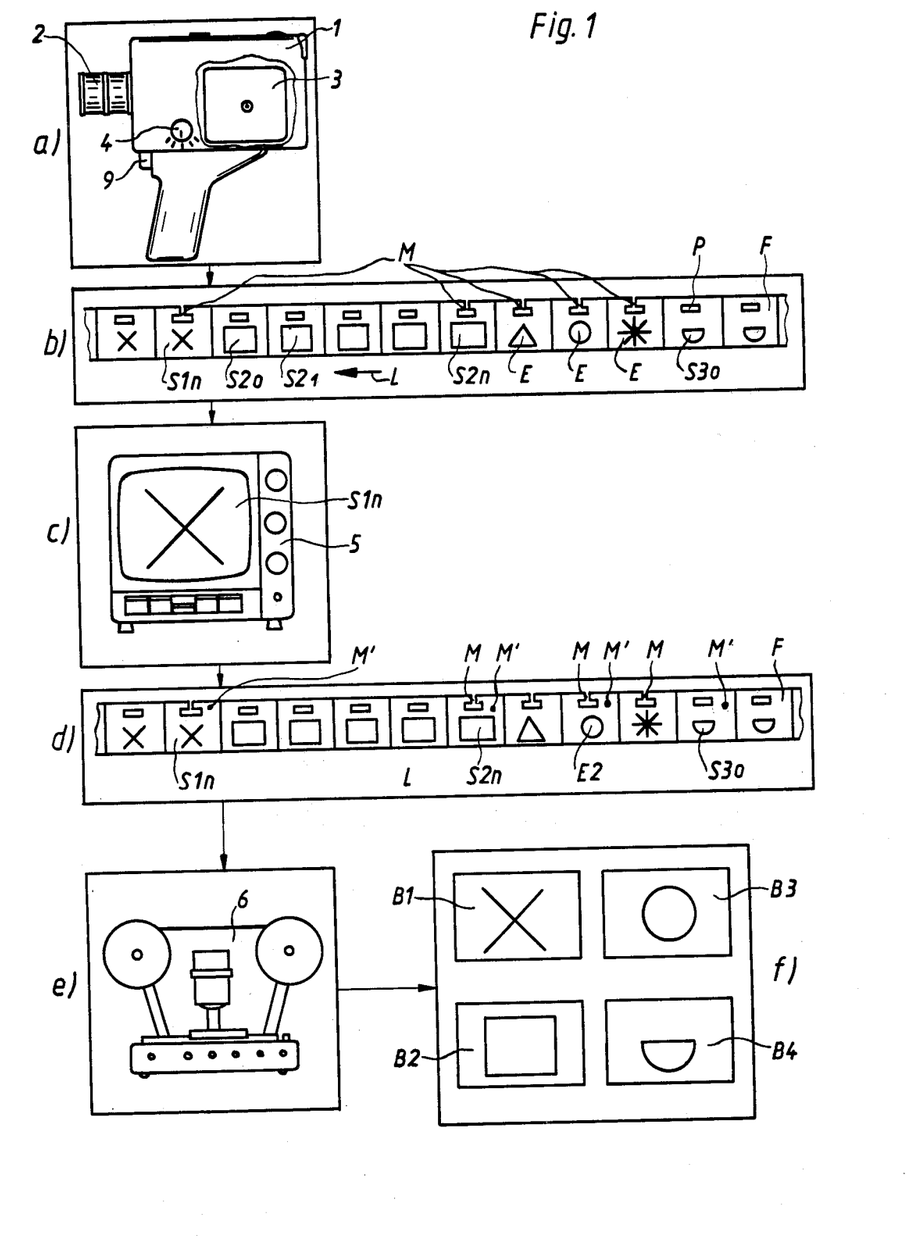
FIG. 1 is an explanatory diagram illustrating the technique of the present invention.

FIG. 1 schematically illustrates the applicability of the present invention to intermixed motion-picture and single-exposure recording and reproduction. At step a, a camera 1 containing a film cassette 3 exposes a film frame through the camera objective 2 when the user depresses the camera release button 9. By means of a rotary selector switch 4, the user can select between motion-picture and single-exposure operation.

The camera 1 includes a marking arrangement which in response to activation of the camera release 9 provides a special frame marking on the film. The marking arrangement can take a variety of forms, some of which are described below for illustrative purposes.

The exposed film F, automatically provided in the camera with certain frame markings, is developed in conventional manner whereupon it has the appearance depicted at step b. As shown at b, the film frames comprise motion-picture scenes interspersed with single-exposure shots, this being represented by the crosses, boxes, the triangle, the circle, and so forth. The film perforations P are shown enlarged for the sake of illustration, and the height-to-width ratios of the film frames and of the marginal portions of the frames are not actually in correspondence to those of conventional cassette motion-picture film. The last frame $S1_n$ of the first scene (indicated by crosses) is provided at its edge with an end-of-scene frame marking M. Next comes a scene (indicated by boxes) which, although shown as consisting of two film frames would of course typically comprise many more. The last frame $S2_n$ of this second scene is likewise provided with an end-of-scene frame marking M.

At step c, the film is transported through a motion-picture reproducing apparatus 5 which responds to each frame marking, whether an end-of-scene frame marking or a single-exposure frame marking, by interrupting film transport and persistently projecting the one frame so marked. In FIG. 1, frame $S1_n$ is shown viewable on the viewing screen of the apparatus. Also, this reproducing apparatus comprises a marking arrangement of its own which makes possible the provision of additional markings on the edge of the film. For example, at step d, the film is shown provided at its edge with additional markings M' at frames $S1_n$, $S2_n$ and E2. The frame $S3_O$, which is not provided with an interrupt-transport marking M, is also provided with a marking M'. The additional markings M', provided by the reproducing apparatus 5 in step c, serve to indicate the film frames from which prints are to be made. Of course, the marking device in reproducing apparatus 5 could provide each successive film frame, whether having a marking M or not, with a print marking M', i.e., for the case where all frames are to be printed.

In the next step e, a conventional printer 6 is provided with a scanning arrangement for the print marking M' and is used to make the desired number of prints of each frame having a marking M'. In step f, the prints are sent to the customer. The individual print B1 corresponds to frame $S1_n$, print B2 to frame $S2_n$, print B3 to the second single-exposure shot E, and print B4 to frame $S3_O$.

The apparatuses used to implement the procedure explained above will be described further below. From the many shots taken, the user can easily select and mark those suitable for copying. In principle, the marking device in the camera could be coupled to the single-exposure mechanism of the camera and not to the camera release member. In that event, the film would be provided only with single-exposure frame markings, and not additionally with end-of-scene frame markings. If the film frames consist of motion-picture scenes interspersed with still exposures, and such film is run through the reproducing apparatus, the motion-picture scenes will be reproduced in conventional manner, and each time the film comes to a still exposure, film transport will be stopped and the still-exposure frame reproduced persistently. However, it has been found that, upon the conclusion of a motion-picture scene, the sudden appearance of a still-projected frame unrelated in image content to the preceding motion-picture scene, is annoying to the viewer. In contrast, it has been found that there is no such annoying effect if, before projecting a still shot subsequent to a motion-picture scene, the terminal frame of the preceding motion-picture scene is first projected as a still. This provides a better psychological transition from motion-picture viewing to still-picture viewing. Even so, however, the reproducing apparatus can be provided with selector means such that the transport mechanism stops in response to both end-of-scene and also single-exposure frame markings, or else in response to single-exposure frame markings only.

A photographic film motion-picture camera provided with means automatically producing still-exposure and end-of-scene frame markings on the film is disclosed in our copending application identified above, the entire disclosure of which is incorporated herein by reference. Briefly stated, with that camera, each time the user depresses the camera release button, the film frame previously exposed is provided with an interrupt-transport frame marking. Thus, if the film frame previously exposed was the terminal frame of a motion-picture scene, an end-of-scene frame marking is provided; if the film frame previously exposed was a still shot, then a still-shot frame marking is inherently provided. Alternatively, the frame marking can be provided when the user lets go of the camera release button, i.e., to terminate motion-picture shooting or after shooting a still. As a further possibility, the marking means could be coupled, not to the release button, but instead to the selector switch setting for still exposures, in the event that end-of-scene frame markings are not to be provided.

For the sake of simplicity in FIG. 1, the frame markings are shown right alongside the associated film frames. However, as will become clear from the description of exemplary apparatuses below, in actual practice it is preferable that there be a phase shift or offset as between frame markings and the correlated frames, e.g., in the sense that audio signals recorded on the audio track of a motion-picture film are typically offset from the correlated frames by a distance of 18 frames. More will be said concerning this phase shift further below.

Figure 2:
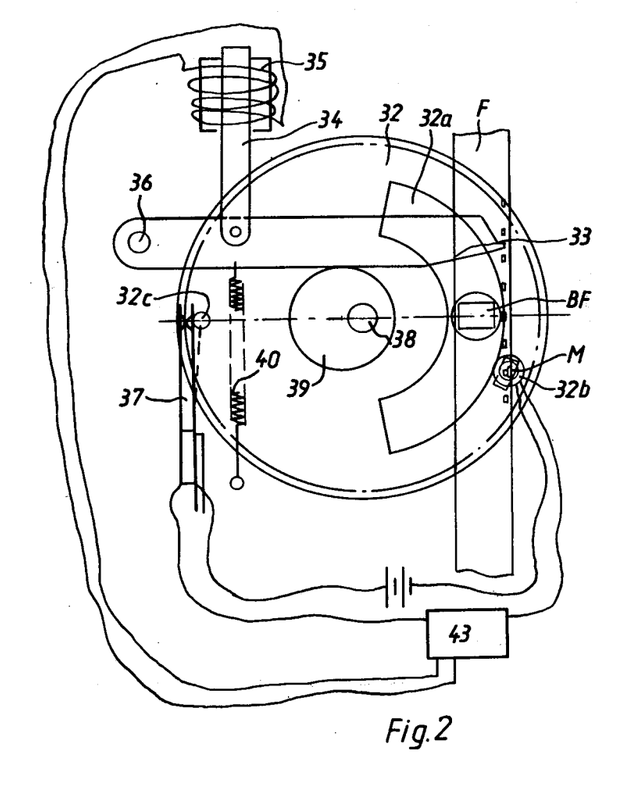
FIGS. 2 and 2a depict part of a motion-picture projector provided with a detector for interrupt-transport frame markings.
Figure 2A:
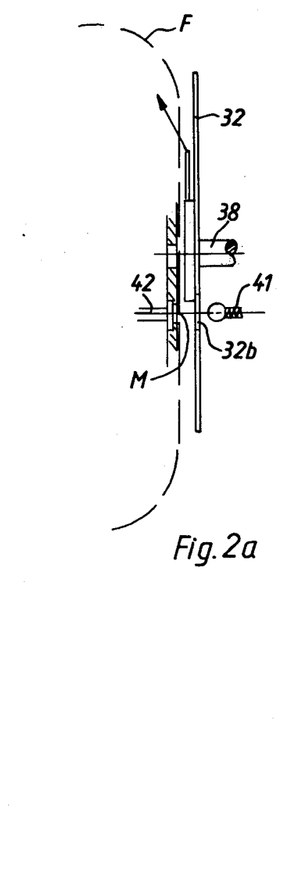

FIGS. 2 and 2a depict part of a motion-picture film projector provided with a detector for interrupt-transport frame markings.

The film transport arrangement of the projector is illustrated to the extent of a transport claw 33 pivoted at 36 and driven in conventional manner by a cam 39 having a drive spindle 38, the film being denoted by F. The armature 34 of an electromagnet 35 is coupled to the transport claw 34, and when electromagnet 35 is energized claw 34 is quickly lifted out of the film, so as to discontinue transport. A tension spring 40 normally urges the claw 33 clockwise. The projector includes a rotary sector-shaped shutter 32 likewise driven by drive spindle 38. Rotary shutter 32 turns through 360° per film frame to be projected. However, a rotary shutter of that configuration is shown here only for the sake of simplicity, and it will be understood that a shutter having more than a single light-transmitting sector would more typically be provided, most typically a shutter having two or three light-transmitting sectors, the shutter in that case rotating through 180° or 120° per film frame.

The detector for the interrupt-frame markings M includes a light source 41, such as an LED, and a light detector 42 aligned therewith, the film F being transported between them. The phase shift, measured as a distance along the length of the film F, between the picture gate BF of the projector and the detector 41, 42 must, of course, correspond to the phase shift between the picture gate and marking means of the camera originally used to provide the frame markings M, unless the frame markings M are to be provided for the first time in the projector itself.

The rim of sector shutter 32 is provided with an aperture 32b. Aperture 32b moves into a position between light source 41 and light detector 42, unblocking the light path therebetween, during the film-standstill intervals during the intermittent film transport of motion-picture projection. At other times, the light path of detector 41, 42 is blocked, to minimize the possibility that the automatic interrupt-transport action might be triggered improperly. Accordingly, detector 41, 42 is gated for operation only at exactly the times that a frame presently being projected is at a momentary (or more protracted) standstill at the picture gate, and accordingly with the interrupt-transport marking M (if any) located exactly between light source 41 and light detector 42.

Alternatively to this purely optomechanical gating of the marking detection, the gating could be established by electrical means. To this end, a pin 32c on the rotary shutter 32, when it reaches a predetermined angular position, briefly closes an electrical switch 37, thereby briefly energizing light source 41 by connecting it to the illustrated battery. A schematically depicted switching circuit 43, connected to marking detector 41, 42, responds to the detection of a frame marking M by energizing electromagnet 35, thereby causing claw 33 to be lifted out of the film F and preventing the continuation of film transport. Although FIG. 2 depicts the timing switch 37 and the timing aperture 32b in shutter 32 as being used in conjunction, it is preferred that only one or the other timing technique be employed. In the case that timing switch 37 is not employed, it will be understood that light source 41 is uninterruptedly energized from the illustrated battery so long as the projector is switched on. The switching circuit 43 can be a timer circuit which, when activated by a signal from marking detector 41, 42, responds by keeping electromagnet 35 energized for only a limited predetermined time interval, following which electromagnet 35 deenergizes and film transport resumes until the next frame marking M (whether end-of-scene or still-shot) is detected. Alternatively, switching circuit 43 can be self-latching, so that film transport cannot resume until the operator commands a continuation of film transport, for example by pressing a pushbutton on the housing of the projector.

Figure 3:
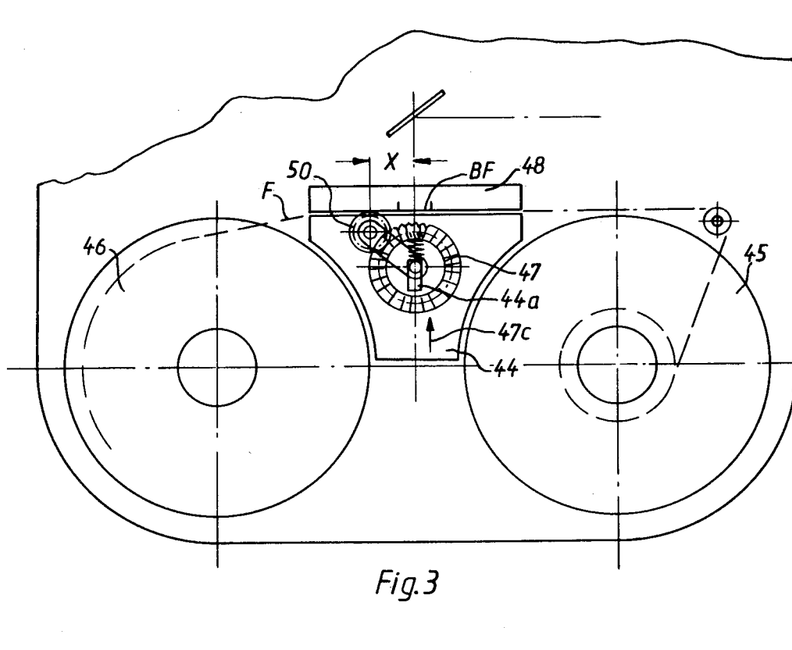
FIGS. 3 and 3a depict part of a reproducing apparatus provided with means for applying further markings to the recording medium.
Figure 3A:
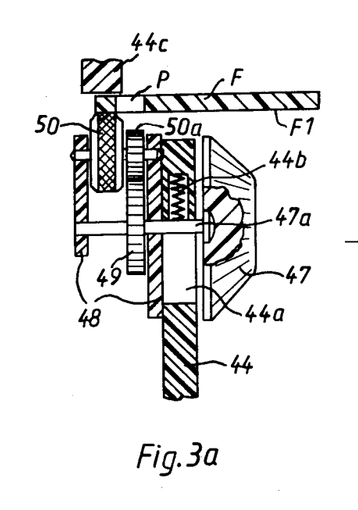

FIGS. 3 and 3a depict a motion-picture projector provided with means for applying additional markings, or for providing interrupt-transport frame markings for the first time in the event these have not been provided previously.

The film F is transported, per se conventionally, from a supply spool 45 along a film support 48 to a take-up spool 46. Details of the film transport mechanism and of the projection optics and projection light source are not depicted, because in themselves these can be conventional. As shown in FIG. 3a, a rod 47a extends out through a wall 44 of the projector housing. Rod 47a carries an exteriorly accessible rotary knob 47. Rod 47a extends through a frame 48 and also carries a gear 49. Gear 49 meshes with the drive pinion 50a of a small milling wheel 50, likewise rotatably supported in the frame 48. Accordingly, if the operator manually rotates knob 47, this rotates milling wheel 50 through gears 49 and 50a. The frame 48 with the milling wheel 50, rod 47a and rotary knob 47 is mounted for movement towards and away from the film F through a range delimited by an aperture 44a in the wall 44 of the projector housing. A compression spring 44b normally urges components 47a, 47, 48, 49, 50a and thereby milling wheel 50 away from the film F. However, if the user shifts rotary knob 47 upwards to the position shown in FIG. 3a, the small milling wheel 50 engages the film F at the marginal portion thereof outwardly (leftwardly in FIG. 3a) of the film perforations P, and in particular engages the emulsion side F1 of the film. A support member 44c supports the film F from its other side.

If now the film F is to be provided with a marking correlated with the film frame presently located at the projection gate BF, the operator advances the film, e.g., manually, a further distance X (leftwards in FIG. 3) corresponding to the phase shift between the projection gate BF and the marking detector of the apparatus, or of the reproducing apparatus through which the film is later to be run. The operator then grasps rotary knob 47, shifts it upwards, and commences to rotate it. As a result, the small milling wheel 50 scrapes the emulsion off the film F at the proper location at the edge of the film.

In FIGS. 3 and 3a, the milling wheel 50 is located to provide markings at the edge of the film alongside the film perforations. If the film has already been provided with end-of-scene and/or still-shot frame markings in the camera through which the film had originally been exposed, then these auxiliary markings are preferably located differently than the interrupt-transport markings, e.g., as shown in FIG. 3a to the left of the film perforations P if the interrupt-transport markings are lined up with the perforations P intermediate successive perforations, or vice versa. However, the markings provided by milling wheel 50 could likewise be interrupt-transport markings, for example in case the camera used to expose the film was not provided with automatic marking means, or in the case that additional interrupt-transport markings, i.e., besides those automatically provided by the camera, are desired.

Figure 4:
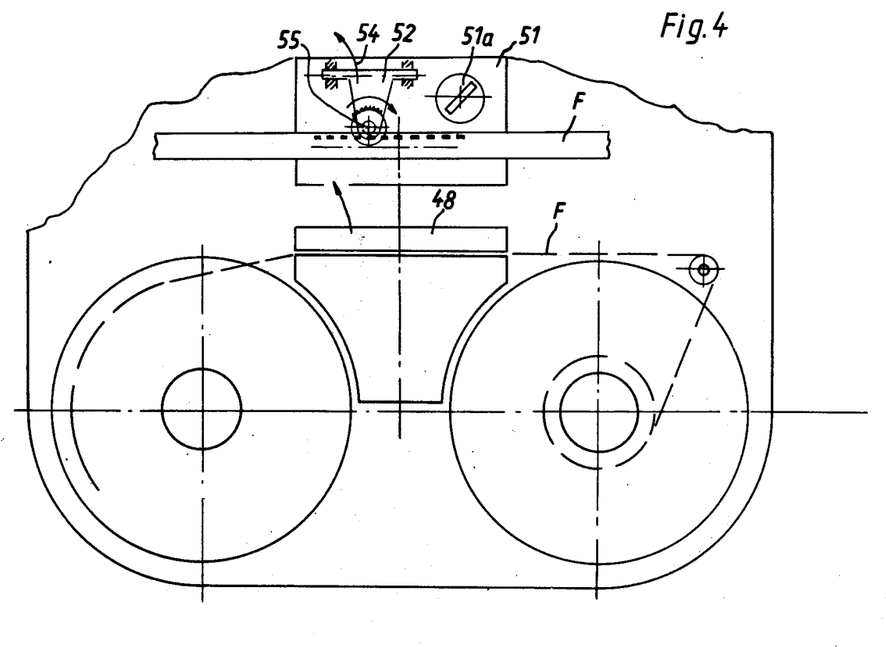
FIG. 4 depicts another reproducing apparatus provided with means for applying further markings to the recording medium.

FIG. 4 depicts the relevant part of a reproducing apparatus (e.g., a motion-picture projector or manually driven motion-picture viewer) provided with a different device for providing film markings. Here, to provide a marking on film F, the user lifts the stretch of film intermediate the supply and take-up reels out of the film guide path and lays it flat on a marking unit 51. Marking unit 51 is held in place by a screw 51a which, if loosened, permits unit 51 to be removed from the reproducing apparatus as a whole. Unit 51 includes a milling disk 55 the axial end face of which includes an annular zone of roughened structure for scraping emulsion off the marginal portion of the film F. The milling disk 55 can be manually turned as in FIGS. 3 and 3a, or else be motor driven, e.g., off the film transport motor of the apparatus. Of course, before commencing the scraping operation, the film F must be properly positioned, so that the scraped-off marking will exhibit the proper phase shift relative to the correlated film frame. Preferably the milling disk 55 is mounted on a swing rod 52, so that the milling device can be swung up away from the film F, as indicated by the arrow 54.

Figure 5:
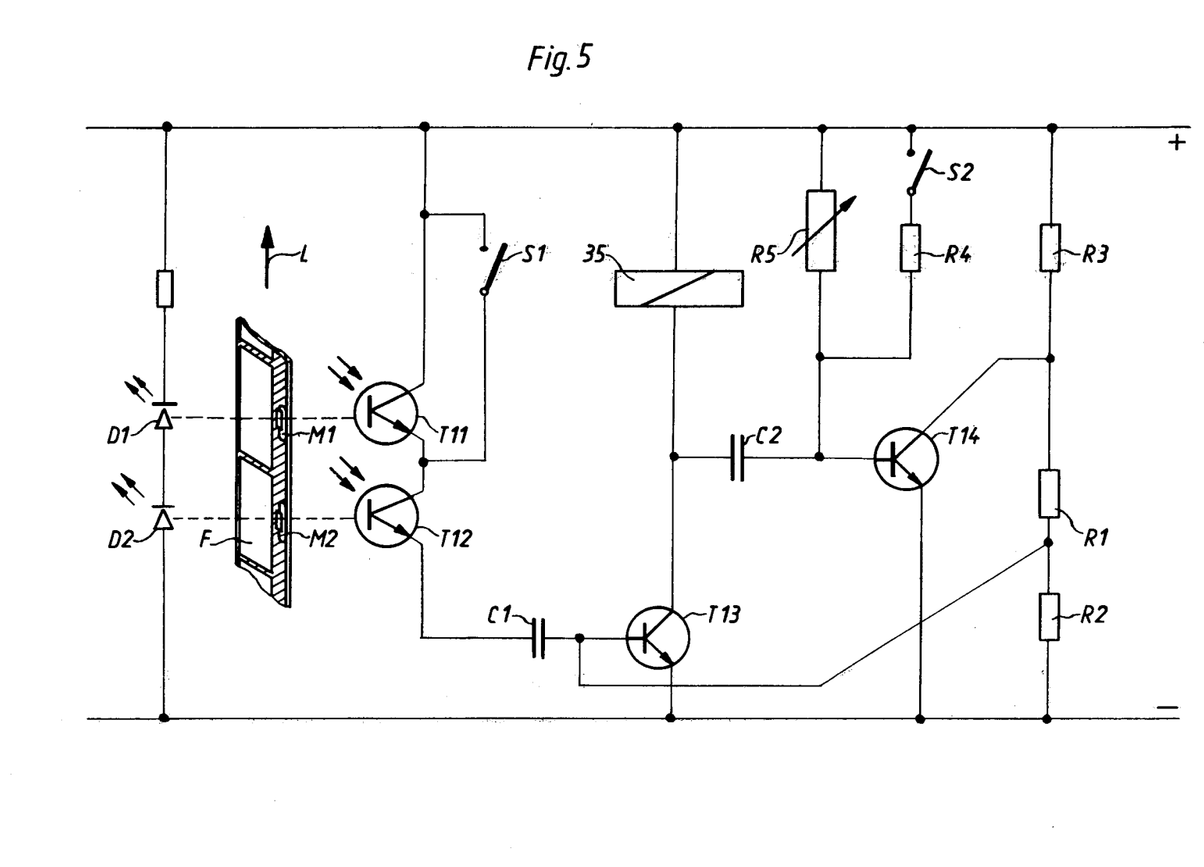
FIG. 5 depicts a detector circuit capable of distinguishing between still-shot frame markings and end-of-scene frame markings.

FIG. 5 schematically depicts a detector arrangement capable of distinguishing between end-of-scene frame markings and still-shot frame markings, although the markings themselves are identically formed. The detector can be set to discontinue film transport only in response to still-shot frame markings, or additionally in response to end-of-scene frame markings.

The detector arrangement comprises two light-emitting diodes D1, D2 spaced apart in the film transport direction a distance corresponding to the interperforation interval or film frame length, plus two phototransistors T11, T12 cooperating therewith to form two marking detectors.

A selector switch S1 can be used to short-circuit phototransistor T11. The phototransistors are connected via a capacitor C1 to the base of a transistor T13 which carries the current for a discontinue-transport electromagnet 35 (e.g., as in FIG. 2). The base of transistor 13 is additionally connected to the tap between resistors R1, R2 of a voltage divider R1, R2, R3.

The lower terminal of electromagnet 35 is connected via a capacitor C2 to the base of a transistor T14. The junction between capacitor C2 and transistor T14 is connected to one terminal of two parallel-connected resistors R4, R5. Resistor R5 is adjustable, and resistor R4 is fixed but can be switched into and out of the circuit by means of a switch S2. The emitter of transistor T14 is connected via resistor R3 to the positive voltage supply terminal.

The detector arrangement depicted in FIG. 5 operates as follows:

Transistors T14 and T13 are normally conductive and non-conductive, respectively. Electromagnet 35 is unenergized and the film transport claw of the projector (see e.g. FIG. 2) transports the film intermittently in the direction of arrow L, for motion-picture reproduction. For the sake of simplicity, it is assumed that the light-emitting diodes D1, D2 are illuminated uninterruptedly, although they are preferably gated or clocked.

If switch S1 is open as shown, then as soon as two frame markings M1, M2 move into register with the marking detectors D1, T11 and D2, T12, the phototransistors T11, T12 become conductive, and a high positive voltage is transmitted via the presently uncharged capacitor C1 to the base of transistor T13, rendering the latter conductive. As a result, electromagnetic 35 becomes energized, the film transport claw (see e.g. FIG. 2) is lifted away from the film, and film transport is not continued. The film frame associated with interrupt-transport frame marking M2 is persistently projected as a still.

When transistor T13 becomes conductive, the potential at the left electrode of the presently uncharged capacitor C2 is pulled down to ground, rendering transistor T12 non-conductive. Transistor T13, however, remains conductive, being forward-biased by the voltage at the junction between resistors R1 and R2.

Meanwhile, capacitor C2 commences to charge through time-constant-determining resistor R5. When the potential at the right electrode of capacitor C2 becomes positive enough, transistor T14 returns to its conductive state. As a result the potential at the emitter of T14 drops to ground, and therefore the potential at the junction of voltage-divider resistors R1, R2 is now so negative as to render transistor T13 non-conductive again. This deenergizes the electromagnet 35, and the film transport claw moves back to the plane of the film F, where it can again enter into a film perforation and resume film transport.

It will be appreciated that the film frame associated with marking M2 must be a still-shot frame marking. A still-shot frame marking is preceded either by the still-shot frame marking of the preceding still-shot frame, or else is preceded by the end-of-scene frame marking of the terminal frame of the preceding motion-picture scene. Accordingly, with switch S1 open as shown, each and every still-shot frame is projected as a still. If only one frame marking M passes the two detectors, this can only signify the terminal frame of a motion-picture scene followed by another motion-picture scene. Only one of the two phototransistors T11, T12 is rendered conductive, and therefore the transistors T13 is not rendered conductive. Thus, with switch S1 open, the projector does not stop and project the terminal frames of motion-picture scenes as stills. In the explanatory situation depicted in FIG. 5, it is assumed that the still-shot frame marking M2 is not followed by another frame marking; i.e., the next film frame is not a still-shot film frame, but is instead the initial frame of a motion-picture scene. Accordingly, after the frame associated with marking M2 has been projected as a still and frame transport has resumed, the projector will not again stop for a still-image projection until the next pair of adjoining frame markings, i.e., until the next still-shot frame.

If the switch S1 is closed, then the projector will stop for still projection not only of single-shot frames, but of the terminal frames of motion-picture scenes as well. In particular, switch S1 bridges phototransistor T11, so that a single frame marking rendering transistor T12 conductive will be able to render transistor T13 conductive and energize the interrupt-transport electromagnet 35.

Accordingly, with switch S1 open, only still-shot frames are projected as stills, whereas with switch S2 closed both still-shot frames and end-of-scene frames are projected as stills.

If the user keeps switch S2 closed, then the base of transistor T14 is locked at forward bias, and neither of the interrupt-transport frame markings will stop the projector. Alternatively or in addition, switch S2 can be a momentary switch, which the user would press after the start of a still projection, if the user wishes to continue film transport without first waiting for the still-projection time interval to elapse.

As already stated, it is assumed that the light-emitting diodes D1, D2 are uninterruptedly illuminated. However, in the manner of switch 37 in FIG. 2, the shutter of the projector can be operative for closing a timing switch which illuminates the LED's, and thereby gates the two marking detectors, only during predetermined intervals within the transport cycles. In that event, if the LED's pulsate while an end-of-scene or still-shot frame is at the projection window, a time-delay stage or the like with a suitable time-constant may be necessary, to assure that the pulsating light from the LED's does not reinitiate the interrupt-transport action before film transport can resume.

If the gating of the detection is to be implemented by mechanical means as with aperture 32b in the rotary shutter 32 of FIG. 2, then two such apertures must be provided near the periphery of the shutter and two detectors must be used in the manner of FIG. 5.

In the circuit shown in FIG. 5, it is to be understood that, for the sake of simplicity, conventional components have been omitted, such as biasing resistors, elements protecting the transistors against overload, the power supply employed, and so forth.

Figure 6:
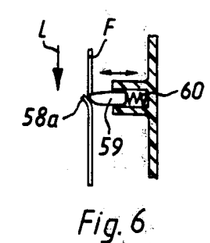
FIG. 6 depicts a detector capable of mechanically detecting mechanically formed frame markings.
Figure 6A:
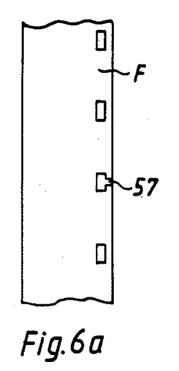
FIGS. 6a and 6b depict two different types of mechanically formed frame markings detectable by the detector of FIG. 6.
Figure 6B:
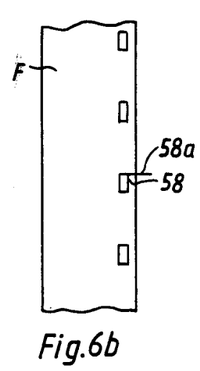

FIGS. 6, 6a and 6b depict a purely mechanical marking and detection technique. In FIG. 6a, the frame marking 57 is constituted by a removed portion of film adjoining a film perforation, formed by making two transverse cuts each extending transverse to the direction of film transport from the rim of a film perforation to the adjoining edge of the film. In FIG. 6b, the frame marking 58 is constituted by a tongue of film adjoining a film perforation, the tongue of film being formed by making a transverse cut through the web alongside the film perforation, near the trailing end of the perforation. Because the transverse cut 58a is near the trailing end of the perforation, the resulting tongue of film alongside the perforation extends in the direction opposite to film transport. A device for making such cuts is disclosed in our copending application identified earlier.

FIG. 6 depicts a detector operative for sensing such a frame marking by pressing against the film F normal to the general plane of the film. Essentially, the detector is an electrical contact comprising a feeler 59 and compression spring 60. When the feeler 59 does not encounter a frame marking, it is kept in its retracted position, but when it encounters a frame marking it depresses the film tongue 58a and leaves its retracted position, thereby closing an electrical detector switch. The detector switch then activates a circuit such as shown in FIG. 5, e.g., rendering transistor T13 thereof conductive. Two such detectors could be provided, in correspondence of the two optical detectors D1, T11 and D2, T12 of FIG. 5. If it is desired to gate the detection performed by mechanical detectors 59, 60, then the aforementioned detector switch could be connected in series with a gating switch, such as switch 37 in FIG. 2.

A particular advantage of this purely mechanical marking and detecting technique is that the detector circuit cannot, as with optically scanned frame markings, be activated by preexposed inscriptions or the like running along the edge of the film. Furthermore, the mechanical components which detect the markings can be of very simple character. If it should happen that a splicing foil bridges over the marking 57 or 58a, this does not prevent detection of the marking because such splicing foil is generally elastic enough to yield in the face of feeler 59. Finally, the provision of frame markings by mechanical means is particularly easy to perform in the projector or other reproducing apparatus, e.g., in case such markings were not automatically provided by the recording apparatus.

Unexpectedly, it has been found that such excisions or incisions of the edge portion of the film do not interfere with proper film transport. Furthermore, the use of a detector which moves perpendicular to the film plane is advantageous, because then the movement of the detector relative to the film is the same as that originally performed by the cutting means. This makes it possible to combine the detector with a marking means. For example, in FIG. 8 of our copending application identified earlier, the cutting blades which form the cuts 57 or 58a are provided on the tooth of the film transport claw. Normally the tooth of the claw enters a film perforation, advances the film, and then leaves the film perforation in preparation for the next one-frame advancement, but with the cutting means not cutting into the film. However, to form a frame marking, the transport claw can be depressed an additional distance towards the film, the cutting blade(s) thereupon forming the cut(s). The transport claw can, in that case, furthermore be lightly spring biased towards the film for frame marking detection; if no frame marking is present, the claw tooth enters a film perforation to the normal depth, whereas if a frame marking is present the tooth enters to a greater depth and thereby closes an electrical contact, the biasing force relied on being insufficient to drive the cutting blade(s) into the film, cutting into the film requiring positive depression of the transport claw. With this technique, there is no phase shift between a frame marking and the correlated film frame, and this is particularly advantageous when editing is to be performed.

Figure 7:
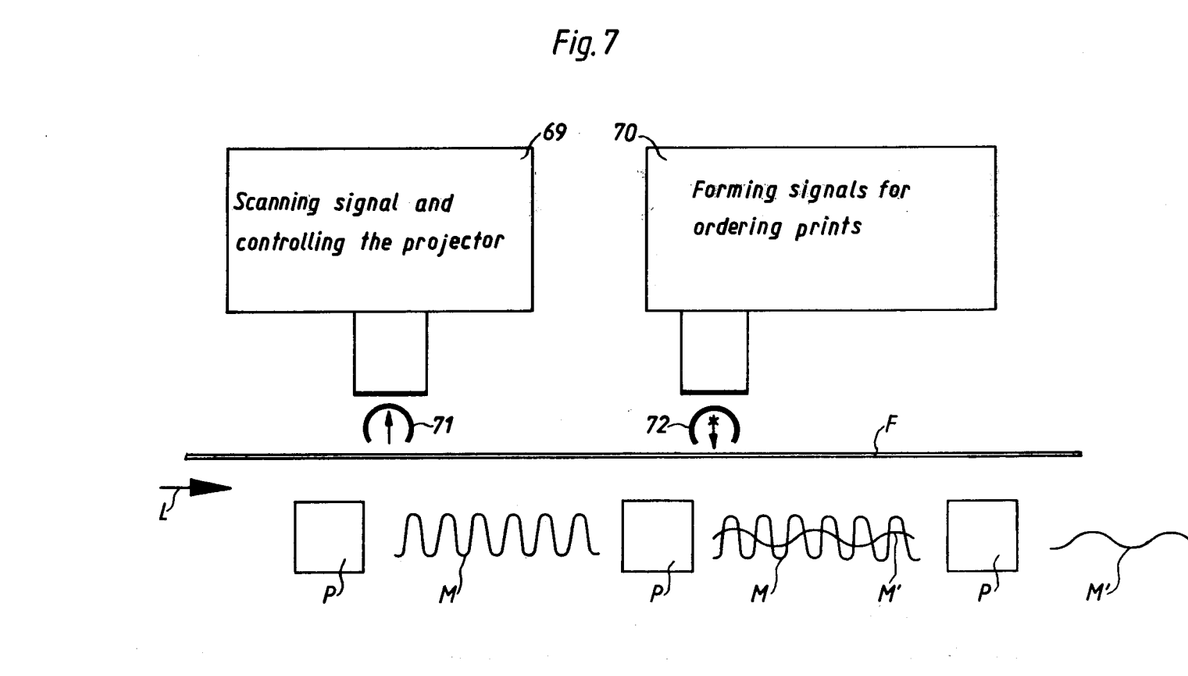
FIG. 7 depicts, in a motion-picture reproducing apparatus, a device for detecting magnetically recorded interrupt-transport markings and for magnetically recording further markings relating to print orders.
Figure 8:
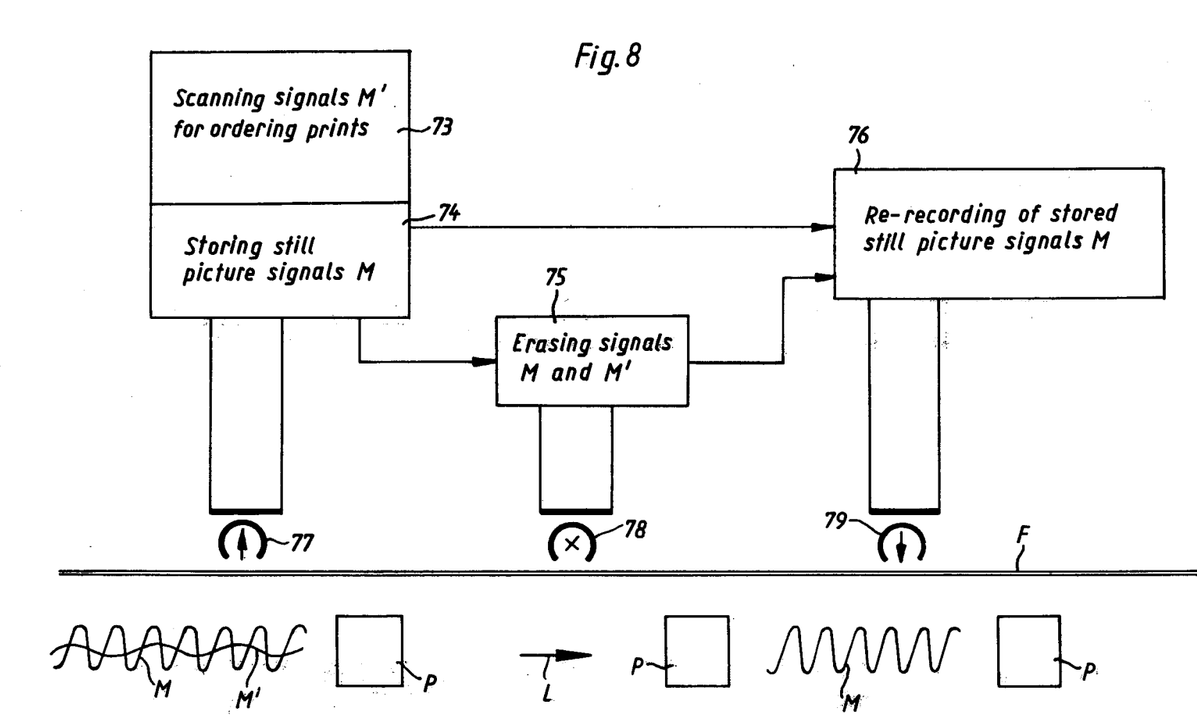
FIG. 8 depicts, in a printing apparatus, a device for the magnetic pick-up of interrupt-transport and printing order markings, for the intermediate storage of the interrupt-transport frame markings, for the subsequent erasing of all such markings from the recording medium, and for thereafter rerecording the stored interrupt-transport frame markings onto the recording medium.

FIGS. 7 and 8 depict a magnetic technique for recording and detecting end-of-scene and/or still-shot frame markings.

Motion-picture film provided with one or two magnetically recordable stripes has been commercially available for a considerable time. Sometimes, such sound motion-picture film is packaged in special cassettes provided with an exposure window and also with an auxiliary access opening for the sound-recording head. More recently, such film has been packaged in ordinary film cassettes, with the sound-recording head accessing the audio track on the film through the exposure window itself. Typically, the film is provided at its unperforated edge with the audio track per se and at its perforated edge with a balance stripe serving to mechanically compensate for the presence of the magnetic stripe at the unperforated film edge. This creates the possibility of providing the frame markings of the present invention on the otherwise unutilized balance stripe.

Preferably, the frame-signal recording head of the camera would then be located in the vicinity of the exposure window of the film cassette, i.e., at a position corresponding to that of the optical marking detector described above, for the sake of compatibility between optically and magnetically recorded frame markings. The intermittent transport of the audio track in the region of the cassette exposure window is of no particular significance because, unlike the recording of a true audio track, the frame markings or signals to be recorded will have, for example, the form of simple pulses and pulse combinations. Furthermore, magnetic recording of frame markings has the advantage that the markings can be later erased. Also, using magnetic recording it is particularly easy to provide markings of distinguishable character. For example, the frame markings may be recorded pulses of differing pulselength and/or frequency. The recording circuit could, for example, include a modulated signal source providing the frame marking or signal per se, the recording head being located in the same way as for optical marking. There would then be recorded on the balance track simple pulses or pulses of oscillating signals, which in the reproducing apparatus would be detected by a pick-up head. Because the auxiliary pick-up head could then be located in the intermittent-transport region of the cassette exposure window, it need not cramp or otherwise interfere with the audio pick-up unit of the reproducing apparatus.

In principle, it would certainly be possible, as an alternative, to record the frame markings not on the balance track but instead on the audio track itself. This has the advantage that the audio track is located at the edge of the film opposite to that provided with the film perforations, so that the pick-up head for the frame signals can be more easily positioned out of the way of the film-transport claw of the reproducing apparatus. Of course, it would then not be possible to record a usual audio signal in superposition upon the frame signals, i.e., without resorting to special measures. The frame signals could be very low or high frequency signals, outside the frequency range of human hearing, and be distinguished from the audio signal on the audio track by means of frequency separators or filters. In that event, however, there is some danger that, when dubbing or rerecording the audio track, the frame signals might be erased along with the audio signal.

As already indicated, if the frame markings are magnetically recorded, there is no particular problem in providing on a single magnetic track signals of different respective types, for example differing in frequency. Thus, in the projector or other reproducing apparatus, it is a simple matter to provide a playback/record head, i.e., as typically used in tape recorders, to detect the frame markings and control film transport in dependence thereon, and switching over into a record mode of operation when additional signals are to be recorded onto the film.

FIG. 7 depicts the transport of a sound motion-picture film F in the direction of arrow L past two heads provided in a motion-picture projector. A first head 71 picks up the magnetically recorded frame markings M, here represented as pulsed oscillations of lower frequency. The frame markings are then used to control film transport in the manner already described, the picked-up frame markings being transmitted to the projector's control circuit, denoted in toto by numeral 69 in FIG. 7. A unit 70 feeds auxiliary markings M', here represented by pulses of lower-frequency oscillations, to a recording head 72 which records these alongside the frame markings M, or superimposed on the markings M. Unit 70 can mainly comprise a user-activated switch which the user depresses to mark frames from which prints should be made, plus a conventional recording circuit including a modulator for forming the auxiliary frame markings M'.

After the film has been provided with the print markings M', it can be run through a printer such as shown in FIG. 8, and the selected frames printed. If the print markings are spatially separated from the interrupt-transport markings, the print markings can be automatically erased prior to return of the film to the customer. For example, the phase shift between a print marking and the associated film frame may differ from the phase shift between that frame and the interrupt-transport marking associated with such frame.

If the interrupt-transport markings M and the print marking M' are not spatially separated on the film, e.g., if they are recorded on the same track and distinguishable only with respect to their frequencies, then special measures must be resorted to in order to be able to erase only the print markings prior to return to the customer. In the printer depicted in FIG. 8, a first head 77 picks up in superposition the interrupt-transport markings M and the print markings M'. A frequency separator or filter arrangement is used to split the markings M from the markings M'. The print markings M' are transmitted to a unit 73 which controls operation of the printer. The interrupt-transport markings M are transmitted to a buffer storage 74. Buffer storage 74 can, for example, be a magnetic plate, a magnetic-tape loop, or the like, inasmuch as only a limited storage capacity is required. However, use could also be made of a solid-state memory. After a frame provided with a print marking M' has been printed, it is transported to an erase head 78, which erases both the interrupt-transport markings M and the print markings M'. Erase head 78 can be uninterruptedly activated or, as indicated in FIG. 8, activated only to erase those sections of the magnetic recording track upon which markings M' have been detected, in which case the picked-up signals M' can be applied to activate the erase head 78 via an appropriate time-delay unit, e.g., a time-delay shift register synchronized with film transport. Then, when such frame reaches a recording head 79, the erased interrupt-transport marking M can be rerecorded, so as to restore the motion-picture film to a condition in which it is again capable of controlling film transport during projection. Again, appropriate time-delay means, synchronized with film transport, can be provided to assure that the frame marking M is restored to its original location on the film, correctly positioned relative to the associated film frame. If the pick-up head for the interrupt-transport markings M in the projector is provided with frequency-separating circuitry, then actually it is practical to leave the print markings M' unerased, inasmuch as they will anyway not trigger an interrupt-transport action.

A further possibility is to provide auxiliary markings which do not merely identify frames to be printed but furthermore indicate for example the number of prints to be made from each frame, the printing format to be employed, or the like, using a suitable marking code. To this end, it is merely necessary to vary further parameters of the pulses recorded, for example the length of the pulsed oscillation, or, within limits, the amplitude of the pulsed oscillation. Because magnetic recording makes it relatively easy to later separate superimposed signals, magnetic recording makes it particularly simple to record fairly complex or numerous commands upon the magnetic marking track.

According to a further concept of the invention, the number of prints to be made from each frame can be indicated by the number of mechanically formed notches correlated with the frame, or by the length of such notch, or by its depth, or by using a notch code involving for example the position of the notch. Various such notch coding techniques are depicted in FIGS. 15a–15d. Such notches can be detected in the printer by mechanical or optical scanning means. In FIG. 15a, different numbers of prints are ordered by utilizing notches of distinguishable types. In FIG. 15b, the number of prints to be made is indicated by the distance d between two notches M'. In FIG. 15c, the number of prints to be made is indicated by the length of the notch.

Figure 9:
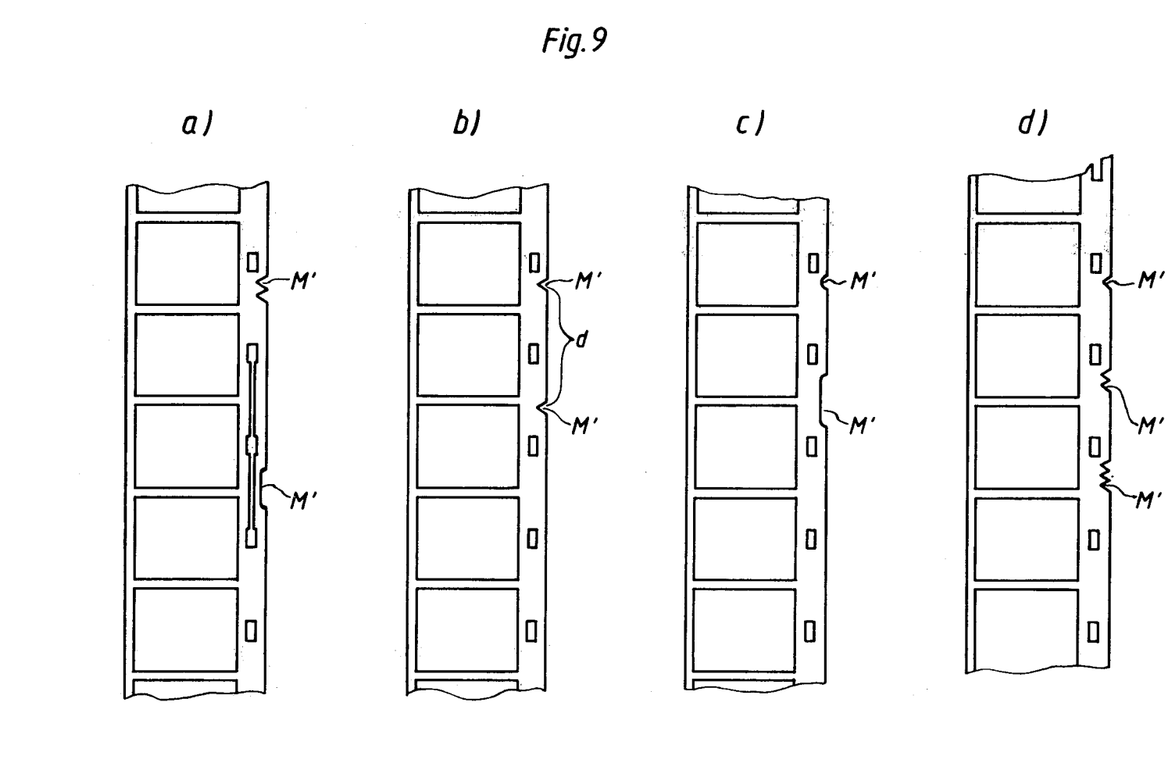
FIGS. 9a-9d depict a few illustrative ways in which a photographic motion-picture film can be provided with printing order markings.

In FIG. 15d, finally, the number of prints to be made is indicated by the number of notches.

It should be noted that optical marking detection can readily enough be used to detect and then separate optical markings of sufficiently distinguishable frequencies. As already stated, the perforated marginal portion of the film can be longitudinally subdivided into two tracks, one for single-shot frame markings and the other for printing order markings. In that event, it is advantageous to provide the printing order markings between the film perforations and the nearer film edge, because this zone of the film is particularly easy to mechanically process.

It shoud also be noted that, even when interrupt-transport markings are formed by optical means, it is still possible to add on and if desired thereafter erase further optically detected markings. If the markings on the processed film are light zones against a dark background, additional markings can be provided, in the manner already explained, by scraping or scratching off film layers at the dark zones, and then these can be erased by covering them over with an opaque ink, or the like, or by sticking on an adhesive tape of opaque material. The reverse applies to the recording and erasing of additional markings, when the markings are dark zones against a light background.

In the foregoing, for explanatory purposes, the invention has been illustrated in the context of cinematographic equipment. However, the inventive concepts are equally applicable, for example, to video filming and reproduction using magnetic or optical image-recording techniques. With present-day video systems of the oblique-track magnetic-tape type, or of the type comprising rotating so-called "image plates," the persistent reproduction of an end-of-scene frame is possible by interrupting tape transport and repeatedly scanning the data pertaining to such frame. Such tape could then be provided with frame markings of the type already described, for example on its synch track or synch tape, alongside or superimposed on the recorded picture signal.

Alternatively, the prints made from marked frames in the printer need not be photographically produced. Instead, for example, the prints could be made using dot recording techniques of the type used in telephonic facsimile systems, or using electrophotographic or ink-jet techniques, or the like.

It will be understood that each of the elements described above, or two or more together, may also find a useful application in other types of constructions and circuits differing from the types described above.

While the invention has been illustrated and described as embodied in a cinematographic context, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an apparatus for reproducing motion pictures recorded on a recording medium, in combination, reproducing means operative for reproducing successive image frames on the recording medium, including transport means for transporting the recording medium through the apparatus; and interrupt-transport marking detector means operative for detecting interrupt-transport frame markings on the recording medium correlated with certain image frames and in response to such detection causing the transport means to discontinue recording medium transport so that the reproducing means reproduces those image frames as still images, the marking detector means being adapted to detect both end-of-scene interrupt-transport frame markings correlated with the terminal frames of motion-picture scenes and still-shot interrupt-transport frame markings correlated with recorded still shots, the marking detector means including discriminating means for discriminating between end-of-scene and still-shot interrupt-transport frame markings and selecting means for selecting the interrupt-transport markings to be detected, the discriminating means comprising means for discriminating between a first case in which a frame provided with an interrupt-transport frame marking is not preceded by a frame provided with an interrupt-transport frame marking, and a second case in which a frame provided with an interrupt-transport frame marking is preceded by a frame provided with an interrupt-transport frame marking, the detector means comprising two marking detectors spaced apart in the direction of recording medium transport a distance corresponding to one image frame, the discriminating means comprising means for differentiating between the case wherein both marking detectors detect interrupt-transport frame markings and the case wherein only one of the two marking detectors detects an interrupt-transport frame marking.

2. In an apparatus for reproducing motion pictures recorded on a recording medium, in combination, reproducing means operative for reproducing successive image frames on the recording medium, including transport means for transporting the recording medium through the apparatus; and interrupt-transport marking detector means operative for detecting interrupt-transport frame markings on the recording medium correlated with certain image frames and in response to such detection causing the transport means to discontinue recording medium transport so that the reproducing means reproduces those image frames as still images, the marking detector means including a magnetic pick-up head for detecting magnetically recorded interrupt-transport frame markings and also further magnetically recorded markings distinguishable from the interrupt-transport frame markings, furthermore including means receiving signals from the pick-up head and storing information concerning the interrupt-transport frame markings, means for erasing both the interrupt-transport frame markings and the further markings, and means for rerecording the erased interrupt-transport frame markings onto the recording medium.

* * * * *